United States Patent
Okada et al.

(10) Patent No.: US 6,899,295 B2
(45) Date of Patent: May 31, 2005

(54) SPINNING REEL HAVING LINE ROLLER MECHANISM

(75) Inventors: Atsuhito Okada, Kasaoka (JP); Yukihisa Sato, Kasaoka (JP)

(73) Assignee: Kabushiki Kaisha Jhoshuya, Tokyo (JP)

( * ) Notice: Subject to any disclaimer, the term of this patent is extended or adjusted under 35 U.S.C. 154(b) by 0 days.

(21) Appl. No.: 10/734,675

(22) Filed: Dec. 15, 2003

(65) Prior Publication Data

US 2004/0124298 A1 Jul. 1, 2004

(51) Int. Cl.$^7$ .............................................. A01K 89/01
(52) U.S. Cl. ................. 242/231; 242/419.5; 242/150 R
(58) Field of Search ............................. 242/231, 419.5, 242/150 R, 232, 419.4, 419.8, 151; 226/190, 192

(56) References Cited

U.S. PATENT DOCUMENTS

| | | | | |
|---|---|---|---|---|
| 2,728,534 A | * | 12/1955 | Wallace | 242/231 |
| 5,573,192 A | * | 11/1996 | Tseng | 242/150 R |
| 5,911,377 A | * | 6/1999 | Jung | 242/231 |
| 6,227,474 B1 | * | 5/2001 | Okada | 242/231 |

FOREIGN PATENT DOCUMENTS

| | | |
|---|---|---|
| FR | 1.252.667 | 12/1960 |
| JP | 63-35579 | 9/1988 |
| JP | 2530821 | 1/1997 |
| JP | 9-107852 | 4/1997 |
| JP | 3057628 | 4/2000 |
| JP | 3102670 | 8/2000 |
| JP | 2003-52282 | 2/2003 |

\* cited by examiner

*Primary Examiner*—Emmanuel Marcelo
(74) *Attorney, Agent, or Firm*—McGuireWoods LLP

(57) ABSTRACT

A spinning reel having a line roller mechanism provided between a bail arm lever and a line slider connected thereto. The line roller mechanism includes a generally cylindrical fishing line guide surface portion along which the fishing line is guided, a first annular guide section positioned in association with the bail arm lever and near the fishing line guide surface, and a second annular guide section positioned in association with the line slider and near the fishing line guide surface. A fishing line nipping surfaces are defined at confronting ends of the first and second annular guide sections. The second annular guide section is slidably movable in the axial direction relative to the first annular guide section. A coil spring is provided for biasing the second annular guide section toward the first annular guide section. The second annular guide section is movable away from the first annular guide section against the biasing force of the coil spring if a tension applied to the fishing line exceeds a predetermined level.

5 Claims, 7 Drawing Sheets

SPINNING REEL HAVING LINE ROLLER MECHANISM

BACKGROUND OF THE INVENTION

The present invention relates to a spinning reel for fishing, and more particularly, to an improvement on a line roller mechanism for guiding a fishing line from a rod tip to a spool during taking-up of the fishing line. Further, the present invention relates to an improvement on a spinning reel described in the commonly assigned U.S. Pat. No. 6,227,474.

In a conventional spinning reel, during fishing line taking-up operation, a line roller revolves around a spool to guide a fishing line from a rod tip to the spool. Thus, the line roller constantly changes its position relative to a fishing line guide, and the fishing line on the spool also constantly changes its winding diameter as it is taken up. Further, the spool constantly changes its position because of its oscillating motion. Therefore, a route along which the fishing line is guided is unstable.

Consequently, various disadvantageous phenomena occur in the conventional spinning reel. For example, the fishing line may be caught between the line roller and a bail arm lever or between the line rotor and a line slider. Alternatively, the fishing line sliding on a guide surface of the line roller moves in an axial direction of the line roller during taking-up of the fishing line. This accumulates distortions on the part of the fishing line being guided by and wound around the spool. Then, as a result, the fishing line may be twined around the tip and/or hooked by the guide of the rod or a reel body to reduce a casting distance of the bait. Moreover, the fishing line may be loosened or even cut away from the spool during casting.

Japanese Patent 3057628 discloses a line roller positioned between a line slider and a bail arm lever. The line slider has one side in confrontation with the bail arm lever, and the one side is provided with an annular guide portion protruding toward the bail arm lever and concentric with the axis of the line roller. Similarly, the bail arm lever has one side in confrontation with the line slider, and the side is provided with an annular guide portion protruding toward the line slider and concentric to the axis of the line roller. In the fishing line rewinding state, the fishing line is brought into contact with the pair of annular guide portions, so that the fishing line can be guided and held at a given position on the line roller.

Japanese Patent 3102670 discloses a line roller disposed between a line slider and a bail arm lever. An outer diameter of the line roller serving as a line guiding surface is gradually reduced from the line slider side toward the bail arm lever side. The bail arm lever is provided with a guide protruding toward the line slider and over the line roller. In the fishing line rewinding state, the fishing line is brought into contact with the guide, so that the displacement of the fishing line toward the bail arm side is regulated.

However, these disclosed arrangements are based on the assumption that the fishing line is subjected to tensile force that exceeds a predetermined level during taking-up of the fishing line. In other words, when a light-weight lure or bait is used and hence the resistance of the water is very small so that the fishing line is not subjected to any significant tensile force, the fishing line is guided from the rod tip to the spool without being pressed against the annular guide portion of JP3057628 or the guide of JP3102670. Consequently, the line distortions can not be removed, and the fishing line may be loosened or entangled because the fishing line is wound over the spool without sufficient tension.

French Patent No. 1,252,667 and Japanese laid open patent application publication No. Hei 9-107852 disclose an improvement on overcoming line entanglement due to line distortion and shortage of line tension during line rewinding operation. A line roller is supported between a bail arm lever and a line slider through a bearing. The line roller includes a sleeve like fixed member fitted over an outer peripheral surface of a collar, and a sleeve like movable piece slidably disposed over the fixed member and movable in an axial direction thereof. The movable piece has one end portion formed with a spring retaining space. A spring accommodated in the space urges the movable member in one axial direction, so that a fishing line running from a tip end of a fishing rod can be nipped between the movable member and the fixed member.

However, since the fishing line is nipped between the sleeve like fixed member and the sleeve like movable piece slidably disposed over the fixed member and movable in an axial direction thereof, the fishing line cannot be caught and pinched between the two fixed member and movable piece unless the fishing line is subjected to tensile force that exceeds a predetermined level when the line is being taken up. Additionally, if a diameter of the fishing line is extremely small, the line can be caught in the gap between the outer peripheral surface of the line guide collar and the sleeve like fixed member or between the sleeve like fixed member and the sleeve like movable piece. As a result, the fishing line becomes damaged and is eventually cut.

Furthermore, the movable piece has one end portion formed with the spring retaining space, and only another end portion is slidably supported over the outer peripheral surface of the fixed movable member. Therefore, the movable piece may easily be warped to give rise to an operation failure by the load that arises when the fishing line is fed from the bail to the line roller. If the movable piece is made to be loosely fitted with the fixed member in order to avoid this problem, then foreign objects such as dirt and sands may be entered into a gap between the fixed member and the movable piece to cause operation failure and the fishing line may be caught into the gap at high probability.

Additionally, the fishing line is constantly pinched between the fixed member and the movable piece rotated together with the fixed member. Therefore, the line vibrates and produces noise to give the angler an unpleasant feeling when the line comes out from the gap between the fixed member and the movable piece as the line is guided from the line roller to the spool. Furthermore, large load is required for rotating the handle when a fish bites the bait to impart an increased tension to the fishing line, because the fishing line is always pinched between the fixed member and the movable piece. This give rise to a risk that the line may be cut by the heavy load to fail in fishing.

Japanese Utility Model Registration No. 2530821 discloses a technique for dissolving the problem of loosening of the line that arises due to twining or insufficient tensile force of the line wound around the spool. To this effect, a friction member is disposed under the fishing line guide path extending from the rod tip to the line roller, and the friction member is designed to contact the underside of the fishing line for applying braking force to the line. However, if insufficient tension is applied to the fishing line due to the employment of a lightweight bait, the friction member cannot provide sufficient braking force and hence the above identified problem cannot be solved.

Japanese Utility Model Publication No. 63-35579 discloses a resisting member disposed forward of a line roller. The resisting member has a friction surface that imparts running resistance to the fishing line coming onto the line roller when the line is taken up. However, since the resisting member always engages the fishing line coming onto the line roller during fishing line winding operation, the problem of heavy turning of the handle for taking-up the fishing line and the risk of cutting the fishing line cannot be overcome. Moreover, the provision of such resisting member forces the user a cumbersome operation. That is, the user must take out the fishing line from the resisting member for line casting, and must set the fishing line at the resisting member after line casting. Consequently, fishing line rewinding operation cannot be started immediately after the bail is turned to its fishing line rewinding position. Additionally, since the resisting member projects from the external surface of the bail arm lever toward upward and frontward, the fishing line may be hooked at the resisting member to cause line cutting during line casting or when the position of the bail is shifted. Moreover, the projecting resisting member may degrade outer appearance of the spinning fishing reel.

SUMMARY OF THE INVENTION

It is therefore an object of the present invention to provide a spinning fishing reel capable of preventing the fishing line from being caught by the line roller and capable of removing line distortion during fishing line taking-up operation.

Another object of the present invention is to provide a spinning fishing reel avoiding the fishing line from becoming loosened during line casting, and capable of performing prompt taking-up of the fishing line immediately after the bail is turned to the fishing line taking-up position as soon as a user feels biting in a fishing from rocks near the shore.

Another object of the present invention is to provide such spinning fishing reel that enhances operability and minimizes line troubles even if the spinning reel is made lightweight, compact and aesthetically excellent.

These and other objects of the present invention will be attained by providing a spinning reel including a reel body, a handle rotatably supported to the reel body, a spool positioned at the front side of the reel body for winding therearound a fishing line, a rotor rotatably supported on the front side of the reel body and rotatable upon rotation of the handle, a bail support arm provided at the rotor, a bail arm lever pivotally supported to the bail support arm, a line slider connected to the bail arm lever and a line roller mechanism provided between the bail arm lever and the line slider for guiding travel of the fishing line toward the spool. The line roller mechanism includes a generally cylindrical fishing line guide surface portion, a first guide section, a second guide section, and a biasing member. The fishing line is guided along the fishing line guide surface portion. The fishing line guide surface extends in its axial direction. The first guide section is positioned in association with the bail arm lever and near the fishing line guide surface. The first guide section has a first nipping surface. The second guide section is positioned in association with the line slider and near the fishing line guide surface. The first and the second guide sections are arrayed side by side in the axial direction. The second guide section has a second nipping surface positioned in confrontation with the first nipping surface for pinching the fishing line between the first and second nipping surfaces. One of the first guide section and the second guide section is slidably movable in the axial direction relative to the remaining one of the first guide section and the second guide section. The biasing member biases one of the first guide section and the second guide section toward the remaining one of the first guide section and the second guide section.

DETAILED DESCRIPTION OF THE PREFERRED EMBODIMENTS

A spinning reel according to a first embodiment of the present invention will be described with reference to FIGS. 1 through 6.

Figure 1:
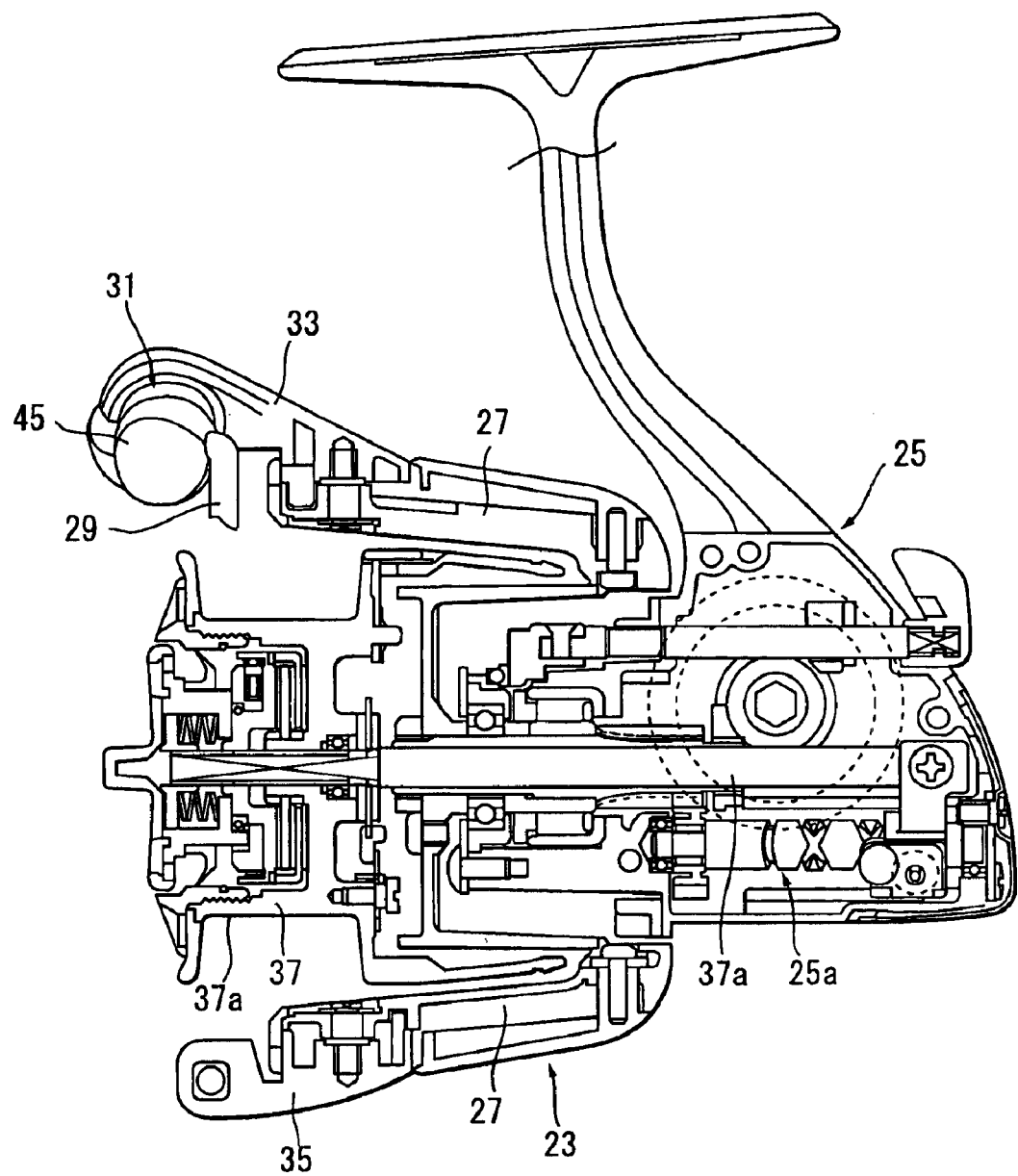
FIG. 1 is a schematic cross-sectional front view showing a spinning reel according to a first embodiment of the present invention.

Referring to FIG. 1, a spinning reel for angling includes a reel body 25, a rotor 23 rotatably assembled to the reel body 25 and a spool 37. A pair of bail support arms 27, 27 are provided integrally with the rotor 23. One of the bail support arms 27 has a front end portion to which a bail arm lever 33 is pivotally connected. The other bail support arm 27 has a front end portion to which a bail arm holder 35 is pivotally connected.

A line slider 45 is provided in association with the bail arm lever 33, and a semi-circular bail 29 has one end connected to the line slider 45 and has another end connected to the bail arm holder 35, so that the bail 29 is angularly movable between a fishing line taking-up position and a fishing line releasing position. A line roller section 31 is rotatably supported at a position between the bail arm lever 33 and the line slider 45.

The spool 37 is supported to the reel body 25 at a position coaxial with a rotation axis of the rotor 23. The spool 37 is supported by a spool shaft 37a oscillatingly movable with respect to the reel body 25 by a conventional oscillating mechanism 25a. Thus, as the rotor 23 is rotated by manually rotating a handle (not shown), the fishing line (not shown) is evenly wound over the spool 37 that is slidably oscillated frontward and rearward in an interlocking relation to the rotation.

More specifically, when the bail 29 is turned to the fishing line taking-up position and the rotor 23 is rotated by means of the manipulation of the handle for taking-up the line while guiding the fishing line to the line roller section 31, the fishing line is wound around the spool 37 that is oscillated in interlocking relation to the rotation of the rotor 23 while being guided by the line roller section 31. When, on the other hand, the bail 29 is moved to the fishing line releasing position and the bait is casted, the fishing line is spirally fed out from the spool 37.

Figure 2:
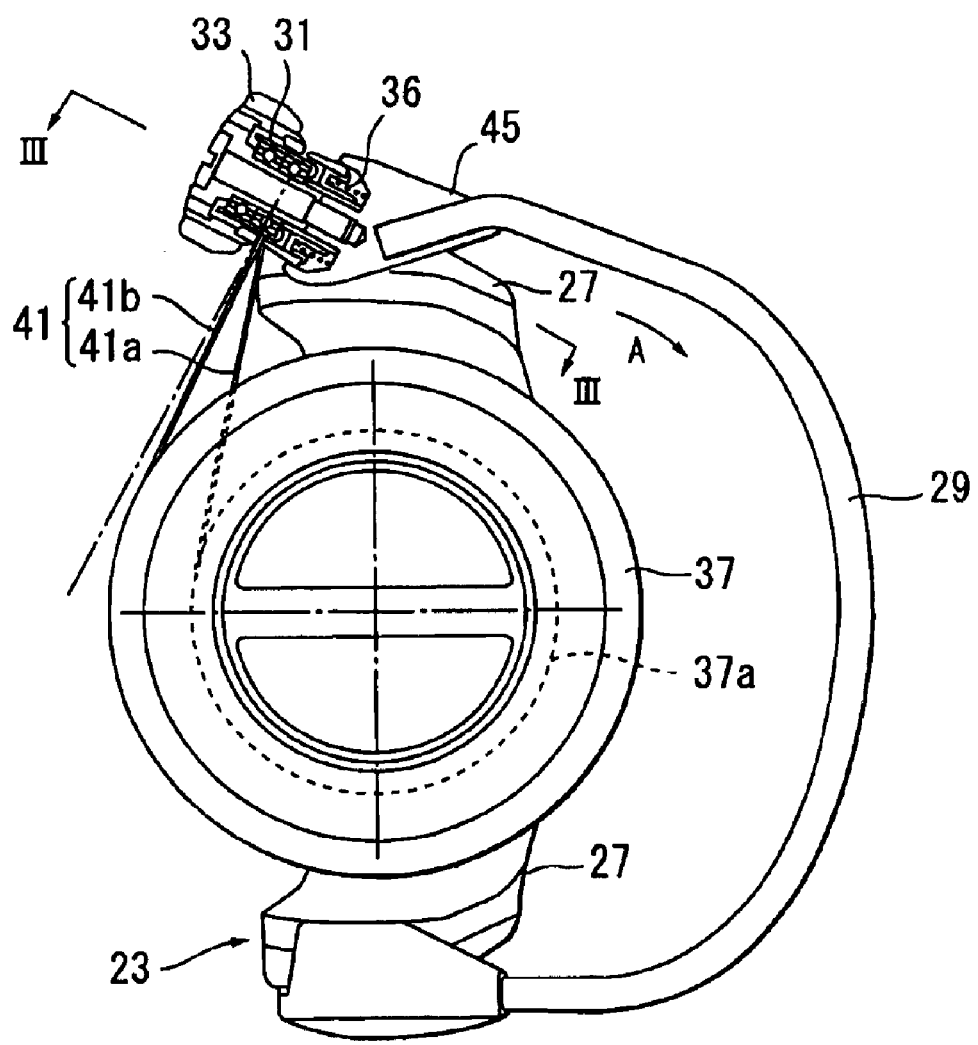
FIG. 2 is a partial cross-sectional left side view showing the spinning reel according to the first embodiment.
Figure 3:
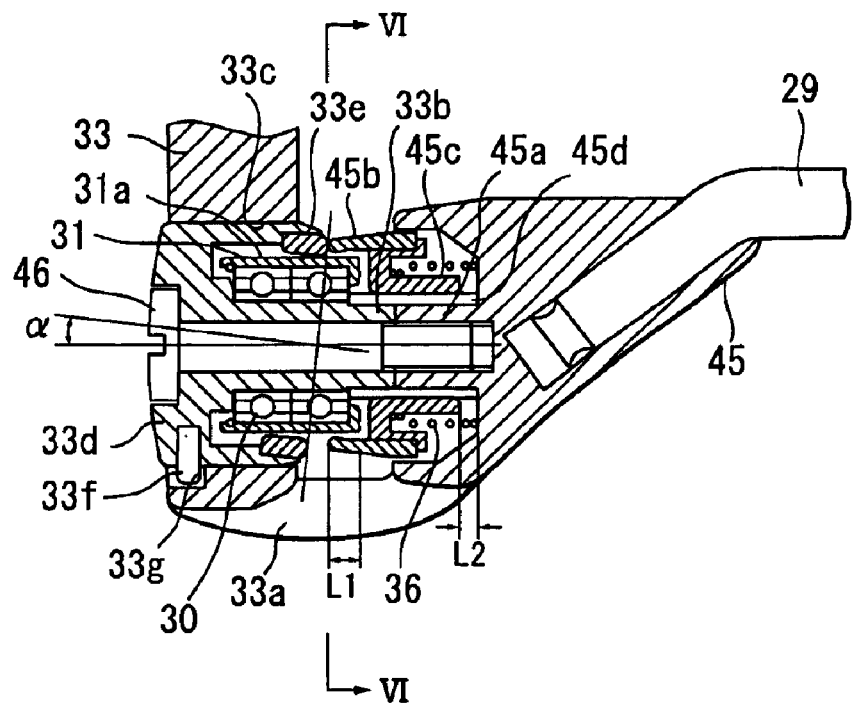
FIG. 3 is an enlarged cross-sectional view taken along the line III—III in FIG. 2.
Figure 5:
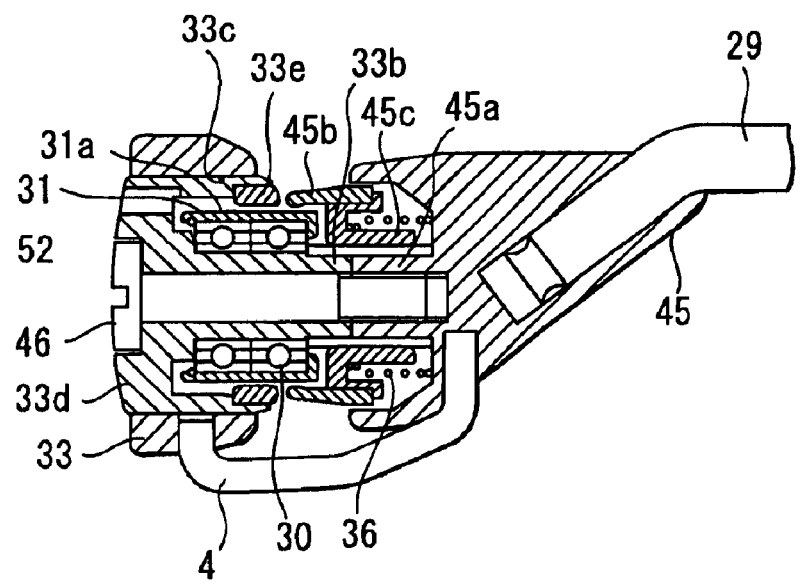
FIG. 5 is an enlarged cross-sectional view taken along the line V—V in FIG. 4.

FIGS. 2, 3 and 5 illustrate a structure for assembling the line roller section 31 to the bail arm lever 33. The line slider 45 is positioned at the front end of the bail arm lever 33 and is connected thereto by a support beam 33a. The line slider 45 has a substantially U-shaped cross-section and is an integral piece. The line slider 45 has a shaft sleeve 45a, and the bail arm lever 33 has a shaft sleeve 33b aligned coaxially with the shaft sleeve 45a. The line slider 45 is fixedly secured to the bail arm lever 33 by a bolt 46 threadingly engaged with the shaft sleeves 33b and 45a. The line roller section 31 is rotatably supported on the shaft sleeve 33b through a bearing 30. The line roller section 31 has an outer peripheral surface 31a along which the fishing line is guided. The line roller section 31 has a uniform outer diameter along its length.

The line roller section 31 is generally made from a high hardness material. For example, a ceramic material or a copper alloy is used as a material of the line roller section 31 and high hardness plating layer is formed on the outer surface. Alternatively, also available, as a material of the line roller, are aluminum subjected to oxidizing treatment or high hardness plating, and a stainless steel subjected to ion plating. Incidentally, in the depicted embodiment, the line roller section 31 has the uniform outer diameter along its length. However, a line roller having a barrel shaped profile is also available.

As shown in FIG. 5, the front end portion of the bail arm lever 33 has a circular profile, and a circular through hole 33c is formed in the front end portion coaxially therewith. A supporting portion 33d which is one of the components of the bail arm lever 33 is rotatably fitted in the circular through hole 33c. The above-described shaft sleeve 33b is provided integral with the supporting portion 33d for rotatably supporting the line roller section 31. An annular guide portion 33e is fixed to the supporting portion 33d at a position in confrontation with the line slider 45 and protrudes radially inwardly toward the center of the line roller section 31. The annular guide portion 33e has a hollow cylindrical profile and is made of a high hardness ceramic material. More specifically, the annular guide portion 33e is rigidly held in position and projecting inwardly toward the center of the line roller section 31 in such a way that it is located on an inner periphery of the disk-shaped supporting portion 33d and outwardly relative to the fishing line guide portion 31a of the line roller section 31.

A positioning projection 33f protrudes radially outwardly from the outer peripheral surface of the supporting portion 33d. On the other hand, the circular through hole 33c is formed with a plurality of positioning recesses 33g arrayed in a circumferential direction of the through hole 33c. A rotational position of the supporting portion 33d relative to the through hole 33c is selectively fixed by the engagement of the positioning projection 33f with one of the positioning recesses 33g. Therefore, the fishing line pinching position defined by the annular guide portion 33e and an another annular guide portion 45b (described later) can be provided at a region indicated by X in FIG. 6. Further, this rotational position of the supporting portion 33d is fixedly secured by fastening the bolt 46 relative to the shaft sleeve 45a.

As is apparent from FIG. 3, the axis of the annular guide portion 33e is inclined by an angle α relative to the rotary axis of the line roller section 31 and hence to the axis of the shaft sleeve 33b rotatably supporting the line roller section 31.

On the other hand, the front end of the line slider 45 has a circular profile as in the case of the front end of the bail arm lever 33. An annular guide portion 45b extends coaxially with the rotary axis of the line roller toward the longitudinal center of the line roller section 31 and is positioned at the front side of the line slider 45. As described above, the line slider 45 is provided with the shaft sleeve 45a arranged coaxially with the shaft sleeve 33b of the bail arm lever 33 and rigidly secured to the shaft sleeve 33b by the bolt 46. A slider 45c is slidably mounted on the shaft sleeve 45a by way of a collar 45d. The annular guide portion 45b having a hollow cylindrical profile and made from a high hardness ceramic material is rigidly held to slider 45c in such a manner that an axis of a cylindrical section of the annular guide portion 45b is co-incident with the axis of the line roller section 31. Thus, the annular guide portion 45b is slidably movable together with the slider 45c in the axial direction of the line roller section 31. Opposing surfaces of the annular guide portions 33e and 45b define therebetween a fishing line guide passage.

A coil spring 36 is interposed between the slider 45c and a base portion of the shaft sleeve 45a of the line slider 45. The annular guide portion 45b is urged by the biasing force of the coil spring 36 and adapted to contact the annular guide portion 33e at the bail arm lever 33. As described above, the cylindrical section of the guide portion 45b is arranged coaxially with the rotary axis of the line roller section 31, so that the guide portion 45b is slidable in the axial direction of the line roller section 31. On the other hand, the cylindrical section of the annular guide portion 33e is forwardly inclined by the angle α relative to the rotary axis of the line roller section 31.

Therefore, as is apparent from FIG. 3, a sufficient distance is provided between the opposing surfaces of the guide portions 33e and 45b defining the fishing line guide passage at the fishing rod side (lower side in FIG. 3), whereas a narrow distance is provided between the opposing surfaces of the guide portions 33e and 45b defining the fishing line guide passage at the spool side (upper side in FIG. 3). That is, the fishing line guide passage defined between the confronting surfaces of the guide portions 33e and 45b has a V-shape providing an angle α therebewteen widely opened at the fishing rod side and gradually narrowed toward the spool side.

The inclination of the annular guide portion 33e relative to the line roller section 31 and the annular guide portion 45b can be easily adjusted by engaging the positioning projection 33f with a suitable one of the positioning recesses 33g. As a result, fishing line nipping position between the confronting guide portions 33e and 45b can be changed.

Further, as shown in FIG. 5, another positioning recess is further formed at the inner peripheral surface of the through hole 33c of the bail arm lever 33 similar to the positioning recesses 33g but positioned greatly apart therefrom. The positioning recess is also engageable with the positioning projection 33f for largely shifting the angular rotational position of the supporting portion 33d, that is the angular rotational position of the annular guide portion 33e for providing the fishing line nipping position at a position Y in FIG. 6 so as to nullify the annular guide portions 33e and 45b.

Figure 4:
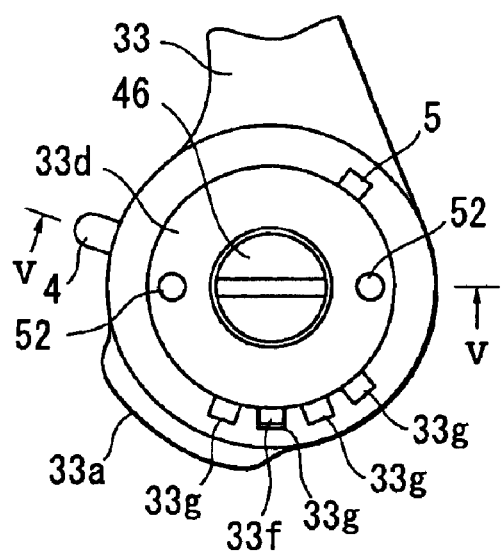
FIG. 4 is a schematic side view as seen from the left of FIG. 3.
Figure 6:
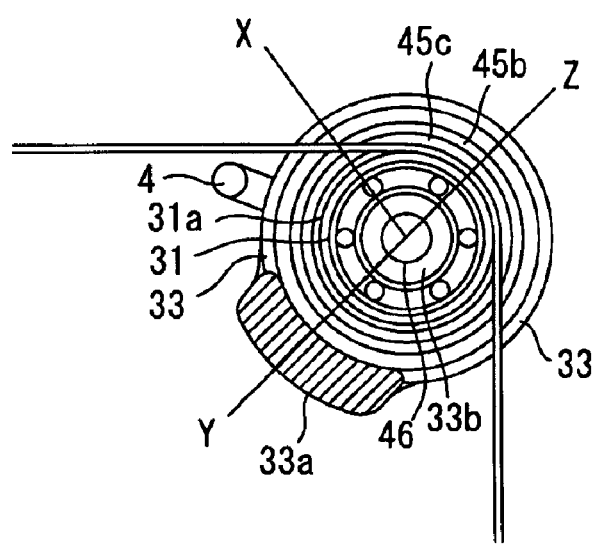
FIG. 6 is a cross-sectional view taken along the line VI—VI in FIG. 3.

In FIGS. 4 through 6, a guide member 4 is bridged between the bail arm lever 33 and the line slider 45 and is located at a front position of the line guide path extending from the line roller section 31 to the spool 37. When the fishing line is taken up, the guide member 4 restricts any possible forward deflection of the fishing line 41 and allows the fishing line to be uniformly wound around the spool 37.

Additionally, the rotary axis of the line roller section 31 is so oriented that the fishing line 41 guided by the line roller section 31 can be displaced toward the line slider 45 due to own tension during fishing line taking-up operation. To this effect, the rotary axis of the line roller section 31 is so oriented that intersection angle between the fishing line guide portion 31a and the fishing line 41b (FIG. 2) becomes obtuse angle when the fishing line wound over the line winding portion 37a of the spool 37 provides the greatest diameter and, the intersection angle between the fishing line guide portion 31a and the fishing line 41a (FIG. 2) becomes increased when the winding diameter of the fishing line wound over the line winding portion 37a of the spool 37 is gradually reduced to the smallest diameter. Incidentally in FIG. 4, water drain holes 52 are formed in the supporting portion 33d mounted on the bail arm lever 33 in order to discharge the water that has been entered a bearing 30 of the line roller section 31 to the outside.

With this structure, after the bail 29 is turned to the fishing line releasing position (not shown), the fishing line wound around the winding portion 37a of the spool 37 is casted. Then, after the bail 29 is turned back to the line winding position, the fishing line 41 is picked up by the bail 29. With this state, as the rotor 23 is rotated in the direction indicated by arrow in FIG. 2 by the handle (not shown), the fishing line 41 picked up by the bail 29 slides on the bail 41 and the line slider 45 and moves to the outer peripheral surface 31a of the line roller section 31. As the fishing line 41 moves to the outer peripheral surface 31a of the line roller section 31, the fishing line 41 is automatically directed and pinched between the pair of annular guide portions 33e and 45b. Thus, the fishing line is guided at substantially center position of the line roller section 31. Accordingly, avoided is the thrusting of the fishing line into a space between the line slider 45 and the line roller section 31, or between the bail arm lever 33 and the line roller section 31. Further, since the paired annular guide portions 33e and 45b are positioned radially outside of the line roller section 31, avoided is the biting of the fishing line between the inner peripheral surfaces of the annular guide portions 33b, 45b and the outer peripheral surface of the line roller section 31. Thus, the risk of fishing line cutting or damage to the fishing line can be minimized in comparison with the conventional spinning reels to enhance fishing performance.

Further, as described above the fishing line guide groove defined between the confronting surfaces of the paired annular guide portions 33e and 45b is gradually open from the rear side to the front side to form the V-shape with the angle α. Thus, the fishing line 41 guided by the line roller section 31 is moved from the wide part of the fishing line guide groove to the narrow part thereof and can be caught at the latter part. Therefore, the fishing line 41 can be reliably pinched between the paired annular guide portions 33e, 45b regardless of the tension applied to the fishing line. In short, as the fishing line 41 is guided from the rod tip to the spool 37, the fishing line is pinched between the paired annular guide portions 33e and 45b at a hatching part of FIG. 6 positioned at a rear side of the line roller section 31. For this reason, even if a lightweight lure or bait is used and hence the fishing line 41 is not subjected to any significant tensile force when it is taken up, the line 41 can be reliably pinched between the paired annular guide portions 33e and 45b i.e., in the substantially V-shaped fishing line guide groove. Additionally, distortion of the fishing line 41 can be removed when the fishing line passes through the pinched position. Further, sufficient tension can be imparted on the fishing line after the fishing line passes through the pinched position. Consequently, loosening of the fishing line can be avoided.

Furthermore, the paired annular guide portions 33e and 45b are fixed to the bail arm lever 33 and the line slider 45, respectively, so that the guide portions 33e, 45b do not rotate together with the line roller section 31 that is driven to be rotated upon guiding the fishing line from the rod tip to the spool 37. Therefore, the problem of vibration of the fishing line 41 being guided to the spool 37 by the line roller section 31 and emission of noise can be effectively prevented from occurring so that the angler does not have any unpleasant feeling.

Further, there is a case where a tensile force of the line 41 that is guided by the line roller section 31 from the rod tip to the spool 37 is smaller than a predetermined level. In other words, there is a case where the moving force of the fishing line toward the bail arm lever 33 due to the tension of the fishing line 41 guided by the line roller section 31 during taking-up operation is smaller than the biasing force of the coil spring 36 associated with the annular guide portion 45b. Even in such a case, the fishing line 41 can be pinched between the paired annular guide portions 33e, 45b because of the biasing force of the coil spring 36, so that the line distortion can be removed when the fishing line 41 is wound around the spool, because a sufficient tension can be applied to the fishing line by the pinching.

On the other hand, there is a case where the tensile force of the fishing line 41 guided by the line roller section 31 exceeds the predetermined level. This is probably because a heavy weight bait is used or the biting fish is being pulled up. In the latter case, the annular guide portion 45b is pushed toward the line slider 45 against the biasing force of the coil spring 36 due to the tensile force of the fishing line 41 that is urged to be moved toward the line slider 45. Then, the fishing line 41 that has been pinched between the paired annular guide portions 33e and 45b is released from the pinching, and is wound around the spool 37 without being subjected to any excessive tensile force. In this case, line distortion can also be removed as it contacts the annular guide portion 45b. Therefore, the angler can handle the spinning reel efficiently for taking up the fishing line and pulling up the biting fish.

As shown in FIG. 3, an overlapping distance L1 of the annular guide portion 45b overlapping with the line roller section 31 is greater than a maximum retractable distance L2 by which the annular guide portion 45b can be moved toward the line slider 45. Therefore, even if the annular guide portion 45b is maximumly retracted toward the line slider due to excessive tension of the fishing line 41, the tip end portion of the annular guide portion 45b is still positioned above the line roller section 31. In other words, the annular guide section 45b is pushed back to the corresponding surface of the line slider 45 only by a limited distance when the fishing line 41 moves toward the line slider 45 by its own tensile force. Therefore, the fishing line 41 guided by the line roller section 31 still contacts the annular guide portion 45b, so that the fishing line can be guided at a predetermined position on the line roller section 31. Thus, the accidental offsetting displacement of the fishing line from the line roller section 31 can be avoided, and the line roller never bites the fishing line.

Further, as described above fishing line pinching position can be altered within the range indicated by X in FIG. 6 by selecting the positioning recess 33g to be engaged with the positioning projection 33f. And, the other positioning recess 5 is formed to alter the pinching position from the region X to a position Y. This means, that the V-shaped fishing line guide groove has the largest open area at a point Z and the narrowest area (pinching point) at the position Y. Because the fishing line moving path is not on the position Y, the fishing line 41 is guided by and wound around the spool 37 without being pinched by the paired annular guide portions 33e, 45b just like conventional line rollers 31. As described above, selective engagement between the positioning projection 33f and one of the positioning recesses 33g and 5 can be performed by unfastening and fastening the bolt 46.

Figure 7:
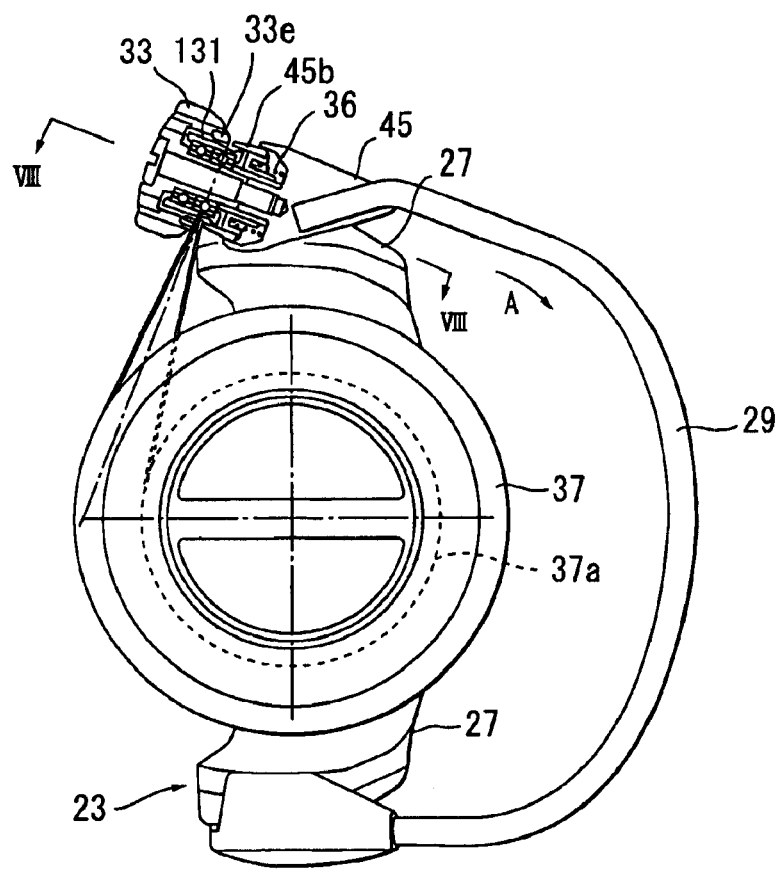
FIG. 7 is a partial cross-sectional left side view showing a spinning reel according to a second embodiment of the present invention.
Figure 8:
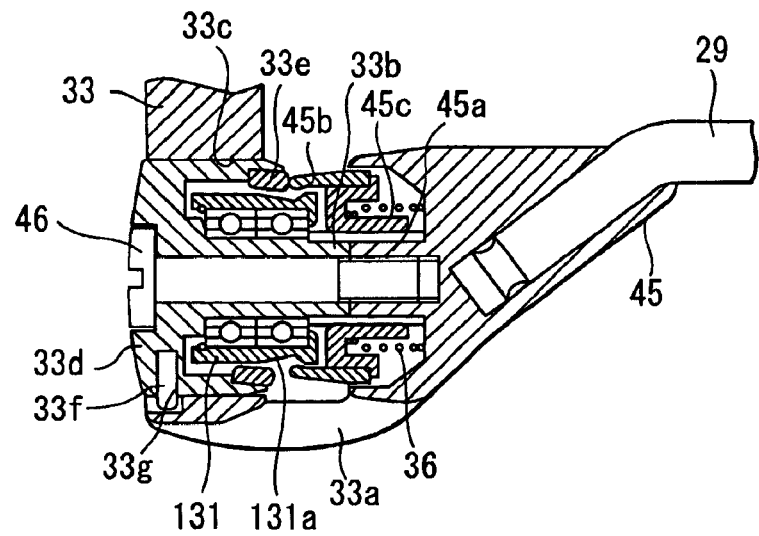
FIG. 8 is an enlarged cross-sectional view taken along the line VIII—VIII in FIG. 7.

Next, a spinning reel according to the second embodiment of the present invention will be described with reference to FIGS. 7 and 8 wherein like parts and components are designated by the same reference numerals and characters as those shown in the first embodiment.

An outer peripheral surface 131a of a line roller 131 is tapered so that a diameter of the line roller 131 is gradually reduced from the side of the bail arm lever 33 to the line slider 45. With this arrangement, the fishing line 41 is urged to be moved toward the line slider 45 by its own tensile force and by the guidance of the tapered outer peripheral surface 131a when the fishing line is guided by the line roller section 31 for taking-up operation.

With this arrangement, similar to the first embodiment, there is a case where a tensile force of the line 41 that is guided by the line roller 131 from the rod tip to the spool 37 is smaller than a predetermined level. In other words, there is a case where the moving force of the fishing line toward the bail arm lever 33 due to the tension of the fishing line 41 guided by the line roller 131 during taking-up operation is smaller than the biasing force of the coil spring 36 associated with the annular guide portion 45b. Even in such a case, the fishing line 41 can be pinched between the paired annular guide portions 33e, 45b because of the biasing force of the coil spring 36, so that the line distortion can be removed when the fishing line 41 is wound around the spool, because a sufficient tension can be applied to the fishing line by the pinching.

On the other hand, there is a case where the tensile force of the fishing line 41 guided by the line roller 131 exceeds the predetermined level. This is probably because a heavy weight bait is used or the biting fish is being pulled up. In the latter case, the annular guide portion 45b is pushed toward the line slider 45 against the biasing force of the coil spring 36 due to the tensile force of the fishing line 41 that is urged to be moved toward the line slider 45. Then, the fishing line 41 that has been pinched between the paired annular guide portions 33e and 45b is released from the pinching, and is wound around the spool 37 without being subjected to any excessive tensile force. In this case, line distortion can also be removed as it contacts the annular guide portion 45b. Therefore, the angler can handle the spinning reel efficiently for taking up the fishing line and pulling up the biting fish.

As described above, according to the first embodiment, the fishing line 41 is urged to be moved toward the line slider 45 by setting a suitable intersecting angle between the fishing line guide surface 31a of the line roller section 31 and a tangential line (see 41a and 41b in FIG. 2) of the spool 37. And according to the second embodiment, the fishing line 41 is urged to be moved toward the line slider 45 by the tapered surface 131a of the line roller 131.

However, the fishing line 41 can be urged toward the line slider 45 by tilting the rotary axis of the line roller in a frontward/backward direction of the reel body 25. For example, one end portion of the fishing line guide surface 31a positioned close to the bail arm lever 33 is positioned ahead of the other end portion of the fishing line guide surface 31a positioned close to the line slider 45. Still alternatively, other known technique may be used or any of the above-described techniques may be combined for use for urging the fishing line toward the line slider 45.

Figure 9:
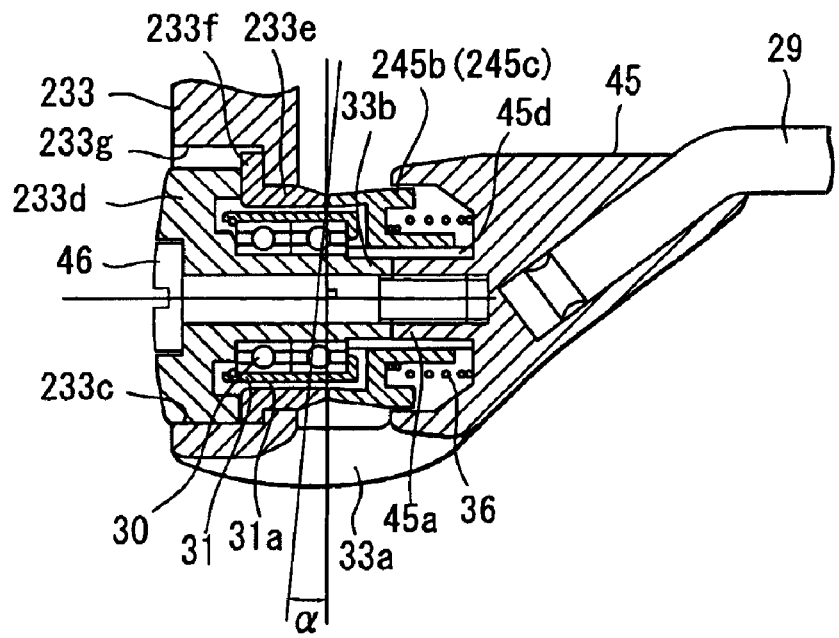
FIG. 9 is an enlarged cross-sectional view showing an essential portion of a spinning reel according to a third embodiment of the present invention and corresponding to FIGS. 3 and 8.

FIG. 9 illustrates a spinning reel according to a third embodiment of the present invention, wherein like parts and components are designated by the same reference numerals and characters as those shown in the foregoing embodiments.

An annular guide portion 233e of this embodiment has an inclined nipping surface in confrontation with another annular guide portion 245b. That is, the nipping surface provides an angle α with respect to a line perpendicular to the axis of the annular guide portion 233e so as to provide a fishing line guide groove whose width is gradually increased toward a front side of the reel body. To this effect, an axial length of the annular guide portion 233e at the front side (lower side in FIG. 9) is smaller than that at the rear side (upper side in FIG. 9).

Further, the annular guide portion 233e has a bail arm lever side provided with a flange, and a positioning projection 233f protrudes radially outwardly from the flange. A through-hole 233c is formed at the end portion of the bail arm lever 233, and a plurality of positioning recesses 233g and 5 (FIG. 4) engageable with the positioning projection 233f are formed at the through-hole 233c. Thus, angular position of the supporting portion 233d relative to the bail arm lever 233 can be fixed by the engagement of the positioning projection 233f with a desired one of the positioning recesses, and the angular position can be maintained by fastening the bolt 45.

The annular guide portion 245b is integrally formed with the slider 45c of the first embodiment and mounted on the shaft sleeve 45a by way of the collar 45d in such a way that the annular guide portion 245b is slidable thereon and a cylindrical part of the annular guide portion 245b is held coaxial with the line roller section 31.

Figure 10:
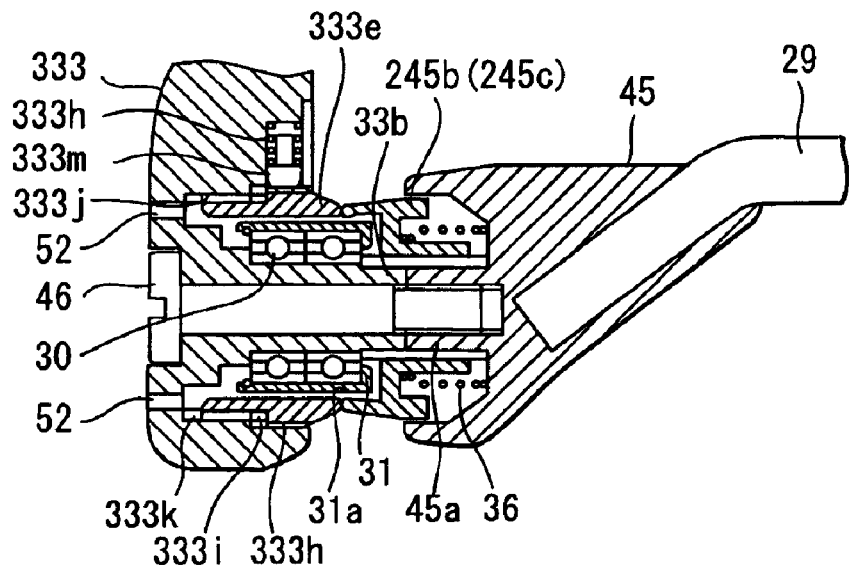
FIG. 10 is an enlarged cross-sectional view showing an essential portion of a spinning reel according to a fourth embodiment of the present invention and corresponding to FIGS. 3 and 8.

FIG. 10 illustrates a spinning reel for angling according to a fourth embodiment of the present invention wherein like parts and components are designated by the same reference numerals and characters as those shown in the foregoing embodiments. Note that FIG. 10 corresponds to FIGS. 3 and 8.

In the third embodiment, a bail arm lever 333 is one piece component formed with a bottomed bore 333j. An annular guide portion 333e of this embodiment has a nipping surface in confrontation with the other annular guide portion 245b. The nipping surface extends in a direction perpendicular to the axis of the annular guide portion 333e. Therefore, the entire confronting surfaces of the annular guide portions 333e and 245b can serve as pinching surfaces.

The annular guide portion 333e has a line slider 45 side where are formed a plurality of positioning grooves 333h extending in the axial direction of the line roller section 31 and distributing over an entire outer periphery of the annular guide portion 333e. The annular guide portion 333e has a bail arm lever 333 side formed with a male thread 333i threadingly engageable with a female thread 333k formed in the bail arm lever 333. Therefore, the annular guide portion 333e is movable in its axial direction by the threading advancement or retracting movement. Further, a positioning pin 333m is assembled in the bail arm lever 333 and is biased by a spring 333n to engage one of the positioning grooves 333h so as to restrict threading rotation of the annular guide portion 333m. A water drain holes 52 are formed in the bail arm lever 333 and held in communication with the outside in order to discharge the water that has entered the bearing support section of the line roller section 31 to the outside.

Because the position of the annular guide portion 333e in its axial direction can be changed, fishing line guiding position on the fishing line guide surface 31a can be altered correspondingly. Further, biasing force of the spring 36 can also be changed. That is, if the annular guide portion 333e is set closer to the line slider 45, the biasing force of the spring 36 can be increased, whereas if the annular guide portion 333e is set closer to the bail arm lever 333, the biasing fore of the spring 36 can be reduced. Consequently, the fishing line can be released from the pinched condition depending on various tension of the fishing line.

Figure 11:
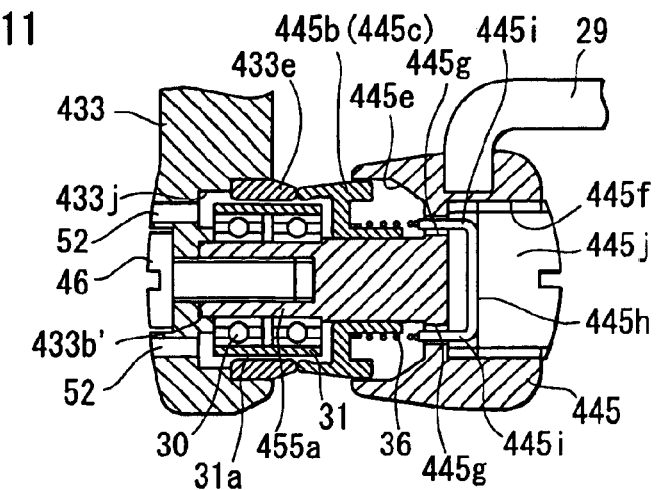
FIG. 11 is an enlarged cross-sectional view showing an essential portion of a spinning reel according to a fifth embodiment of the present invention and corresponding to FIGS. 3 and 8.

FIG. 11 illustrates a spinning reel according to a fifth embodiment of the present invention wherein like parts and components are designated by the same reference numerals and characters as those shown in the foregoing embodiments. Note that FIG. 10 corresponds to FIGS. 3 and 8.

A bail arm lever 433 is formed with a bottomed hole 433j in which a shaft sleeve 433b extends from the bottom toward a line guide 445. The bottomed hole 433j extends co-axially with the line roller section 31. An annular guide portion 433e is fixed to an inner peripheral surface of the bottomed hole 433j. The annular guide portion 433e has a nipping surface in confrontation with another annular guide portion 445b. The nipping surface extends in a direction perpendicular to the axis of the annular guide portion 433e.

The line slider 445 is formed with a bottomed hole 445e in which a shaft sleeve 445a extends from the bottom toward the bail arm lever 433. The shaft sleeves 433b and 445a are fixed together by the bolt 46. The bottom portion is positioned at an axially intermediate position of the line slider 445. The bottomed hole extends coaxial with the line roller section 31a. The other annular guide portion 445b is slidably disposed over the shaft sleeve 445a, and is urged toward the annular guide portion 433e by a coil spring 36. The line roller section 31a is rotatably supported to the shaft sleeve 445a through bearings 30. A water drain hole 52 is formed in the bail arm lever 33 in order to discharge the water that has entered the bearings 30 of the line roller section 31 to the outside.

A bottomed and threaded hole 445f is formed coaxial with the bottomed hole 445e. and at a position opposite to the bail arm lever 433. The bottomed and threaded hole 445f is formed with a female screw. At least two through holes 445g are bored through the bottom of the bottomed and threaded hole 445f at respective positions offset from the center of the bottom so as to communicate with the bottomed hole 345e. A spring seat member 445h is positioned in the bottomed and threaded hole 445f. The spring seat member 445h has a disk shape and is provided with two pusher claws 445i projecting from the outer peripheral edge of the disk. These pusher claws 445i penetrate through the through holes 445g and protrude into the bottomed hole 445e for supporting one end of the spring 36. An adjustment screw 445j is threadingly engageable with the female screw of the threaded hole 445f for pressing the disk portion of the spring seat member 445h. By the rotation of the adjustment screw 445j, the spring seat member 445h is moved in the axial direction of the shaft sleeve 445a for changing the biasing force of the spring 36. Therefore, urging force of the annular guide member 445b toward the annular guide member 433e is controllable.

With this arrangement, the urging force of the annular guide portion 445b to the annular guide portion 333e can be controlled. Thus, the fishing line can be disengaged from the pinching surfaces of the annular guide portions 433e and 445b because of the tension of the fishing line at a selected timing.

Figure 12:
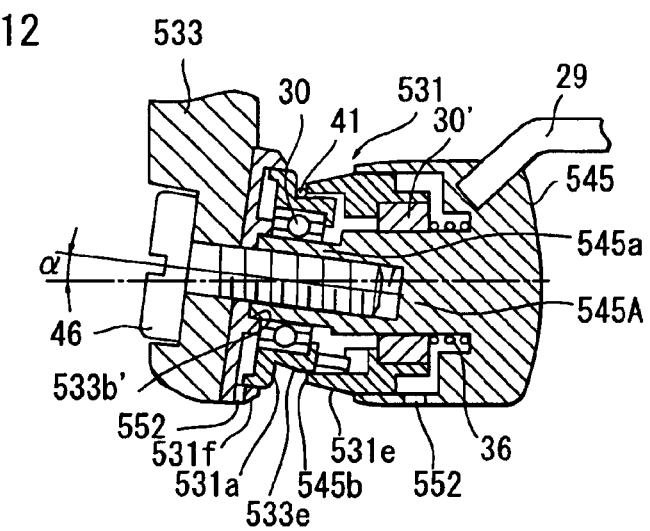
FIG. 12 is an enlarged cross-sectional view showing an essential portion of a spinning reel according to a sixth embodiment of the present invention and corresponding to FIGS. 3 and 8.

FIG. 12 illustrates a spinning reel for angling according to a sixth embodiment of the present invention. Note that FIG. 12 corresponds to FIGS. 3 and 8.

A bail arm lever 533 and a line slider 545 are formed separately. The bail arm lever 533 is provided with an annular projection 533b' formed with an engaging hole. The line slider 545 has a stem portion 545A extending in an axial direction of the line slider 545, a shaft sleeve 545a extending rearwardly by an angle α, from the stem portion 545A with respect to an axis of the line slider 545. The shaft sleeve 545a is engaged with the engaging hole 533b' and is fixed thereto by the bolt 46. Thus, the bail arm lever 533 and the line slider 545 become integral with each other.

A line roller 531 is constructed by a fixed roller piece 531f positioned near the bail arm lever 533 and a movable roller piece 531e positioned near the line slider 545. The fixed roller piece 531f has a fishing line guide surface 531a positioned close to the movable roller piece 531e and an annular guide portion 533e positioned close to the bail arm lever 533. An outer diameter of the fishing line guide surface 531a is gradually reduced toward the side of the bail arm lever 533A. A bearing 30 is mounted on the shaft sleeve 545a for rotatably mounting the fixed roller piece 531f. An inner race of the bearing 30 is in abutment with the tip end of the annular projection 533b'.

The movable roller piece 531e is rotatably and movably supported to the stem portion 545A via a lubrication bearing 30'. A coil spring 36 is interposed between the line slider 545 and the lubrication bearing 30'. The movable roller piece 531e has an annular guide portion 545b which can be positioned over the fishing line guide surface 531a. Water drain holes 552 are formed in the line slider 545 and the bail arm lever 533 in order to discharge the water that has entered the bearing sections 30, 30' to the outside.

Because the shaft sleeve 545a extends obliquely in a rearward direction by the angle α, a fishing line guide groove defined between the annular guide portions 533e and 545b is in a generally V-shaped configuration in which a with of the groove is gradually increased toward the front of the reel body. Further, the annular guide portion 545b is urged toward the annular guide portion 533e by the biasing force of the spring 36.

Because the outer diameter of the fishing line guide surface 531a is gradually reduced toward the bail arm lever 533, the fishing line can be urged toward the smallest diameter area of the fishing line guide surface 531a for facilitating pinching or nipping of the fishing line between the annular guide portions 533e and 545b. Further, because the rotation axis of the fishing line guise surface 531a is slanted by the angle α, the fishing line 41 can be urged toward the line slider 545 during taking-up operation because of the tension of the fishing line.

With this arrangement, when the bail 29 is switched to the fishing line taking-up position shown in FIG. 12, the fishing line 41 picked up by the bail 29 slides on the bail 29 and the line slider 545 and moves to the fishing line guide surface 531a of the line roller 531. As a result of this movement, the fishing line 41 is automatically led to the gap between the paired annular guide portions 533e and 545b of the line roller 531. Since the fishing line guide groove between the paired annular guide portions 533e, 545b has a substantially V-shaped profile that is open toward the front part from the rear part with the angle α, the fishing line 41 moves from the open front area toward the rear part of the fishing line guide groove by the motion of the line roller 531 guiding the fishing line 41. Therefore, the fishing line 41 is pinched between the paired guide portions 533e, 545b regardless of presence or absence of tensile force on the part of the fishing line 41.

Further, there is a case where a tensile force of the line 41 that is guided by the line roller 531 from the rod tip to the spool 37 is smaller than a predetermined level. In other words, there is a case where the moving force of the fishing line toward the bail arm lever 533 due to the tension of the fishing line 41 guided by the line roller 531 during taking-up operation is smaller than the biasing force of the coil spring 36 associated with the annular guide portion 545b. Even in such a case, the fishing line 41 can be pinched between the paired annular guide portions 533e, 545b because of the biasing force of the coil spring 36, so that the line distortion can be removed when the fishing line 41 is wound around the spool, because a sufficient tension can be applied to the fishing line by the pinching.

On the other hand, there is a case where the tensile force of the fishing line 41 guided by the line roller 531 exceeds the predetermined level. In the latter case, the annular guide portion 545*b* is pushed toward the line slider 545 against the biasing force of the coil spring 36 due to the tensile force of the fishing line 41 that is urged to be moved toward the line slider 545. Then, the fishing line 41 that has been pinched between the paired annular guide portions 533*e* and 545*b* is released from the pinching, and is wound around the spool 37 without being subjected to any excessive tensile force. In this case, line distortion can also be removed as it contacts the annular guide portion 545*b*.

In the sixth embodiment, the fishing line guide groove between the two annular guide portions 533*e*, 545*b* shows a substantially V-shaped profile that is open toward the front part from the rear part by tilting the shaft sleeve 545*a* of the line slider 545 rearward by the predetermined angle α. However, a substantially V-shaped fishing line guide groove that is open toward the front part from the rear part with the angle α can alternatively be formed by making a shaft sleeve 33*b* of the bail arm lever 33 and a shaft sleeve 45*a* of the line slider 45 intersect each other with an angle α at the front part and rotatably support the roller pieces 31*e*, 31*f* by way of bearings 30 similar to the first embodiment.

Figure 13:
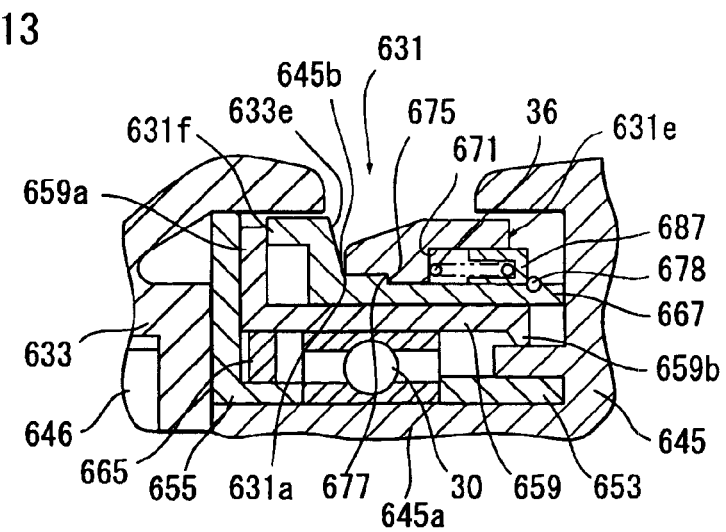
FIG. 13 is an enlarged cross-sectional view showing an essential portion of a spinning reel according to a seventh embodiment of the present invention.

FIG. 13 schematically illustrates a spinning reel for angling according to a seventh embodiment of the present invention. A line slider 645 is formed separately from a bail arm lever 633. The line slider 645 is provided with a metal shaft sleeve 645*a* and is rigidly connected to the bail arm lever 633 by a bolt 646 extending through the metal shaft sleeve 645*a*.

Two cylindrical bearing support members 653, 655 are mounted on and held in engagement with the outer periphery of the shaft sleeve 645*a*. A bearing 30 has an inner race disposed over the shaft sleeve 645*a* and interposed between the cylindrical bearing support members 653, 655 for rotatably supporting a line roller 631 to the shaft sleeve 645*a* through the bearing 30.

A collar 59 is fixedly mounted on an outer race of the bearing 30. The collar 59 has a bail arm lever side provided with a flange 659*a* in sliding contact with the bearing support member 655. The collar 59 has a line slider side provided with a protrusion 659*b* in sliding contact with the line slider 645 for avoiding invasion of dust into the bearing 30. Further, a seal member 665 is interposed between the bearing support member 655 and the collar 659 for avoiding invasion of dust into the bearing 30.

A line roller 631 includes a fixed piece 631*f* and a movable piece 631*e*. The fixed piece 631*f* includes a sleeve section 667 positioned near the line slider 645 and fitted over the collar 659, and an annular guide portion 633*e* positioned near the bail arm lever 633. A fishing line guide surface 631*a* is formed at an outer peripheral surface of the sleeve section 667. Further, a stepped portion 677 is provided at the outer peripheral surface of the sleeve section 667. Moreover, a stop ring 678 is fixed at the outer peripheral surface of the sleeve section 667 at a position near the line slider 645. The flange 659*a* of the collar 659 prevents the fixed piece 631*f* from direct sliding contact with the bearing support 655. Thus, the fixed piece 631*f* is merely rotatable about the shaft sleeve 645*a* through the bearing 30 and the collar 659.

The movable piece 631*e* is slidable with respect to the fishing line guide surface 631*a* in an axial direction thereof. The movable piece 631*e* has a sleeve like configuration including an annular guide portion 645*b* confronting the annular guide portion 633*e* of the fixed piece 631*f*. The movable piece 631*e* has an inner peripheral surface formed with a stepped portion 675 in abutment with the stepped portion 677 of the fixed piece 631*f* for regulating movement of the movable piece 631*e* toward the bail arm lever 633, thereby providing a minute gap between the annular guide portions 633*e* and 645*b*. The gap serves as the fishing line guide groove. Further, a spring retaining space 671 is defined between the inner peripheral surface of the movable piece 631*e* and the outer peripheral surface of the sleeve section 667 of the fixed piece 631*f*. A spring 36 is disposed in the spring retaining space 671. A spring seat member 687 having a U-shape cross-section is disposed at an open end of the spring retaining space 671 for supporting an open end portion of the movable piece 631*e* to the sleeve section 667 of the fixed piece 631*f*. The spring has one end seated on the movable piece 631*e* and has another end seated on the spring seat member 687. The spring seat member 687 is engaged with the stop ring 687 which prevents the spring seat member 687 from further moving toward the line slider 645. Thus, the movable piece 631*e* is slidable over the sleeve 667 and is urged toward the bail arm lever 633. Thus, insufficient operation due to load that arises when the fishing line 41 is fed from the bail 29 to the line roller 631 can be avoided.

Additionally, similar to the first embodiment, the rotary axis of the line roller 631 is so oriented that the fishing line 41 guided by the line roller 631 can be displaced toward the line slider 645 due to own tension during fishing line taking-up operation. To this effect, the rotary axis of the line roller 631 is so oriented that intersection angle between the fishing line guide portion 631*a* and the fishing line 41*b* becomes obtuse angle when the fishing line wound over the line winding portion 37*a* of the spool 37 provides the greatest diameter and, the intersection angle between the fishing line guide portion 631*a* and the fishing line 41*a* becomes increased when the winding diameter of the fishing line wound over the line winding portion 37*a* of the spool 37 is gradually reduced to the smallest diameter.

Further, there is a case where a tensile force of the line 41 that is guided between the annular guide portions 633*e* and 645*b* of the line roller 631 from the rod tip to the spool 37 is smaller than a predetermined level. In such a case, the fishing line 41 can be pinched between the paired annular guide portions 633*e* and 645*b* because of the biasing force of the coil spring 36, so that the line distortion can be removed when the fishing line 41 is wound around the spool, because a sufficient tension can be applied to the fishing line by the pinching.

On the other hand, if the tensile force of the fishing line 41 exceeds the predetermined level, the annular guide portion 645*b* is pushed toward the line slider 645 against the biasing force of the coil spring 36 due to the tensile force of the fishing line 41 that is urged to be moved toward the line slider 645. Then, the fishing line 41 that has been pinched between the paired annular guide portions 633*e* and 645*b* is released from the pinching, and is wound around the spool 37 without being subjected to any excessive tensile force. In this case, line distortion can also be removed as it contacts the annular guide portion 645*b*.

While the invention has been described in detail with reference to specific embodiments thereof, it would be apparent to those skilled in the art that various changes and modifications may be made therein without departing from the spirit and scope of the invention.

For example, in the depicted embodiments, when the fishing line 41 is guided by the line roller and is taken up, the fishing line is moved toward the line slider by own tensile force of the fishing line and the annular guide portion of positioned close to line slider is urged to be moved toward the line slider by the tensile force of the fishing line. However, the operation principle of the present invention may be reversed. More specifically, when the fishing line guided by the line roller and is taken up, the fishing line moves toward the bail arm lever by own tensile force of the fishing line, and the annular guide portion positioned close to the bail arm lever is urged to be moved toward the bail arm lever by the tensile force of the fishing line.

Additionally, in the above-described embodiments, the fishing line is made to contact the end of the annular guide portion projecting from the line slider toward the bail arm lever by regulating the retracting distance of the annular guide portion into the line slider. This arrangement can prevent the fishing line from being trapped into the line roller toward the line slider. However, as a modification, a large diameter guard can alternatively be provided at the end of the line roller located close to the line slider so that the fishing line 41 can be guided at a given position on the line roller for avoiding the line trapping.

What is claimed is:

1. A spinning reel comprising:

a reel body having a front side and a rear side;

a handle rotatably supported to the reel body;

a spool positioned at the front side of the reel body for winding therearound a fishing line;

a rotor rotatably supported on the front side of the reel body and rotatable upon rotation of the handle;

a bail support arm provided at the rotor;

a bail arm lever pivotally supported to the bail support arm;

a line slider connected to the bail arm lever; and a line roller mechanism provided between the bail arm lever and the line slider for guiding travel of the fishing line toward the spool, the line roller mechanism comprising a generally cylindrical fishing line guide surface portion along which the fishing line is guided, the fishing line guide surface extending in its axial direction;

a first guide section positioned in association with the bail arm lever and near the fishing line guide surface, the first guide section having a first nipping surface;

a second guide section positioned in association with the line slider and near the fishing line guide surface, the first and the second guide sections being arranged side by side in the axial direction, and the second guide section having a second nipping surface positioned in confrontation with the first nipping surface for pinching the fishing line between the first and second nipping surfaces, one of the first guide section and the second guide section being slidably movable in the axial direction relative to the remaining one of the first guide section and the second guide section; and a biasing member that biases one of the first guide section and the second guide section toward the remaining one of the first guide section and the second guide section, wherein the fishing line guide surface portion is inclined to urge the fishing line toward a direction for moving one of the first nipping surface and the second nipping surface away from the remaining one of the first nipping surface and the second nipping surface against a biasing force of the biasing member when a tension of the fishing line guided along the fishing line guide surface portion and between the first and second nipping surfaces exceeds a predetermined tension, whereby a fishing line nipping force defined between the first nipping surface and the second nipping surface is nullified.

2. The spinning reel as claimed in claim 1, wherein the first nipping surface and the second nipping surface define therebetween a fishing line guide groove, a width of the fishing line guide groove in the axial direction being gradually reduced from the front side to the rear side.

3. The spinning reel as claimed in claim 2, wherein at least one of the first nipping surface and the second nipping surface comprises the inclined surface to provide the width of the fishing line guide groove, and one of the first guide section and the second guide section having the inclined surface being rotatable relative to associated one of the bail arm lever and the line slider; and further comprising:

means for fixing an angular rotational position of the one of the first guide section and the second guide section with respect to the associated one of the bail arm lever and the line slider for changing a position of the inclined surface, whereby a fishing line nipping force defined between the first nipping surface and the second nipping surface is controllable.

4. The spinning reel as claimed in claim 1, wherein one of the first guide section and the second guide section provides an axial position changeable with respect to the associated one of the bail arm lever and the line slider, the axial position being in the axial direction of the fishing line guide surface portion, whereby a nipping force defined between the first nipping surface and the second nipping surface is controllable.

5. The spinning reel as claimed in claim 1, further comprising a mechanism for changing a biasing force of the biasing member.

* * * * *